United States Patent
Salvino et al.

(10) Patent No.: US 12,186,699 B1
(45) Date of Patent: Jan. 7, 2025

(54) CRYOGEN CHAMBER WITH ADSORBER

(71) Applicants: Chris Salvino, Scottsdale, AZ (US); Andrew Dummer, Chapel Hill, NC (US)

(72) Inventors: Chris Salvino, Scottsdale, AZ (US); Andrew Dummer, Chapel Hill, NC (US)

(73) Assignee: LUNAR HELIUM-3 MINING, LLC, Scottsdale, AZ (US)

( * ) Notice: Subject to any disclaimer, the term of this patent is extended or adjusted under 35 U.S.C. 154(b) by 0 days.

(21) Appl. No.: 18/766,818

(22) Filed: Jul. 9, 2024

(51) Int. Cl.
| | |
|---|---|
| E21C 51/00 | (2006.01) |
| B01D 53/00 | (2006.01) |
| B01D 53/04 | (2006.01) |
| F25J 1/02 | (2006.01) |
| F25J 3/02 | (2006.01) |

(52) U.S. Cl.
CPC ....... B01D 53/002 (2013.01); B01D 53/0415 (2013.01); F25J 1/02 (2013.01); F25J 3/029 (2013.01); B01D 2253/102 (2013.01); B01D 2257/104 (2013.01); B01D 2257/108 (2013.01); B01D 2257/11 (2013.01); E21C 51/00 (2013.01); F25J 2215/30 (2013.01)

(58) Field of Classification Search
CPC .............. B01D 53/002; B01D 53/0415; B01D 2253/102; B01D 2257/104; B01D 2257/108; B01D 2257/11; E21C 51/00; F25J 1/007; F25J 1/001; F25J 1/02; F25J 3/029; F25J 2215/30; F25J 2220/02
USPC .... 62/617, 639, 606, 607, 608; 96/108, 126, 96/134, 136
See application file for complete search history.

(56) References Cited

U.S. PATENT DOCUMENTS

| | | |
|---|---|---|
| 5,168,158 A | 12/1992 | McComas et al. |
| 7,514,694 B2 | 4/2009 | Stephan et al. |
| 7,919,758 B2 | 4/2011 | Stephan et al. |

(Continued)

FOREIGN PATENT DOCUMENTS

| | | | | |
|---|---|---|---|---|
| CN | 113280572 A | * | 8/2021 | ............. F17C 13/00 |
| RU | 2701394 C1 | * | 9/2019 | |

OTHER PUBLICATIONS

Machine-generated English translation of CN 113280572 A, published Aug. 20, 2021 (Year: 2021).*

(Continued)

Primary Examiner — Frank M Lawrence, Jr.
(74) Attorney, Agent, or Firm — Kenneth Altshuler (57) ABSTRACT

Disclosed is a segregating gas arrangement that generally comprises a gas segregation chamber, at least one cooling plate in the gas segregation chamber, and a carbon adsorber in an adsorption gas capturing chamber. The gas segregation chamber has a rim that when resting atop regolith defines a first interior environment. The cooling plates are in the gas segregation chamber, wherein the cooling plates are maintained at a first temperature above 5° K, which is a condensation temperature that higher temperature condensing gases will condense. The adsorption gas capturing chamber defines a second interior environment that is in communication with the first interior environment. The carbon adsorber is in the second interior environment and is maintained at a second temperature below 3° K. The carbon adsorber is configured to capture the low temperature condensing gas.

20 Claims, 8 Drawing Sheets

(56) References Cited

U.S. PATENT DOCUMENTS

| | | |
|---|---|---|
| 8,330,115 B2 | 12/2012 | Frank |
| 9,134,047 B2 | 9/2015 | Black et al. |
| 9,261,468 B2 | 2/2016 | Bingham et al. |
| 9,599,729 B2 | 3/2017 | Roscoe et al. |
| 10,222,121 B2 | 3/2019 | Cullinane et al. |
| 11,624,542 B2 | 4/2023 | Sung |
| 12,066,252 B1 * | 8/2024 | Salvino .................... F28B 9/08 |
| 2002/0066288 A1 * | 6/2002 | Greatbatch ......... C01B 23/0057 62/639 |
| 2013/0034198 A1 | 2/2013 | Chandrasekharan et al. |
| 2023/0411134 A1 | 12/2023 | Ryan et al. |
| 2024/0035379 A1 | 2/2024 | Grillos |

OTHER PUBLICATIONS

Machine-generated English translation of RU 2701394 C1, published Apr. 26, 2019 (Year: 2019).*

RICE, Development of Lunar Ice/Hydrogen Recovery System Architecture, Jan. 1, 2000, p. 36, NIAC, Madison, WI.

* cited by examiner

CRYOGEN CHAMBER WITH ADSORBER

CROSS-REFERENCE TO RELATED APPLICATIONS

None.

BACKGROUND OF THE INVENTION

1. Field of the Invention

The present invention relates generally to mining extraterrestrial sites for gas trapped in extraterrestrial soil.

2. Description of Related Art

Helium-3 (He-3) holds immense potential as a clean and efficient energy source, offering numerous benefits for various applications. It has been discovered that He-3 is a highly efficient fuel for nuclear fusion, which has the potential to provide a nearly limitless and environmentally friendly energy solution. When He-3 fuses with deuterium, it produces a helium atom, a proton, and a tremendous amount of energy. Unlike traditional nuclear fission, fusion reactions release energy without generating hazardous radioactive waste or greenhouse gas emissions. Harnessing He-3 for fusion could revolutionize the energy landscape, providing a stable and sustainable source of power for the future.

However, despite its remarkable benefits, mining He-3 on Earth faces significant limitations. For one thing, He-3 is incredibly scarce on our planet. It is primarily found in minute quantities in the top surfaces of lunar soil, known as regolith, and is sparsely present in the Earth's atmosphere. Consequently, the extraction of He-3, whether on Earth or the Moon, is challenging and expensive. Moreover, mining it on the Moon poses logistical difficulties requiring advanced technologies and significant investments. Even assuming mining on the Moon is successful, transporting the mined He-3 from the Moon to Earth presents significant technical challenges and high costs. These limitations highlight the need for further research and development to find more accessible and cost-effective sources of He-3 or to explore alternative fusion fuel options that do not rely solely on He-3.

The subject matter disclosed herein is generally directed to innovations related to collecting He-3 and other useable gaseous elements on extra-terrestrial bodies.

SUMMARY OF THE INVENTION

The present invention generally relates to mining extraterrestrial sites for gas trapped in extraterrestrial soil.

In that light, certain embodiments of the present invention envision a gas collection system generally comprising a gas segregation chamber, at least one cooling plate in the gas segregation chamber, an adsorption gas capturing chamber connected to the gas segregation chamber and a carbon adsorber in the adsorption gas capturing chamber. The gas segregation chamber comprises a housing, wherein the housing is defined by housing sides that extend from a top housing surface to a rim. A first interior environment is defined within the housing, wherein the first interior environment is in communication with an external environment through only the rim. The external environment defined outside of the housing. At least one cooling plate is in the gas segregation chamber, wherein the least one cooling plate comprises a passageway that is configured to accommodate cryogenic fluid. An adsorption gas capturing chamber is connected to the housing, wherein the adsorption gas capturing chamber comprises a second interior environment that is in communication with the first interior environment via a connecting port. A carbon adsorber is in the second interior environment.

In another aspect of the present invention, some embodiments envision a gas collection arrangement that generally comprises a gas segregation chamber, at least one cooling plate in the gas segregation chamber, an adsorption gas capturing chamber and a carbon adsorber. The gas segregation chamber defines a first interior environment when a rim of the gas segregation chamber rests atop regolith. The gas segregation chamber also comprises at least one cooling plate that is configured to capture higher temperature condensing gas but not low temperature condensing gas, wherein the gases are released from the regolith. The adsorption gas capturing chamber defines a second interior environment that is in communication with the first interior environment via a connecting port. The carbon adsorber is in the second interior environment, wherein the carbon adsorber is configured to capture the low temperature condensing gas.

Another embodiment of the present invention contemplates a segregating gas arrangement generally comprising a gas segregation chamber, at least one cooling plate in the gas segregation chamber, at least one cooling plate in the gas segregation chamber, and a carbon adsorber. The gas segregation chamber comprises a rim that when resting atop regolith defines a first interior environment. The at least one cooling plate is in the gas segregation chamber, wherein the least one cooling plate is maintained at a first temperature above 5° K, which is a condensation temperature at which higher temperature condensing gases condense. The adsorption gas capturing chamber defines a second interior environment that is in communication with the first interior environment. The carbon adsorber is in the second interior environment and is maintained at a second temperature below 3° K. The carbon adsorber is configured to capture the low temperature condensing gas.

Certain other embodiments of the present invention envision a gas segregating method comprising providing a segregating gas arrangement comprising an adsorption gas capturing chamber that is connected to a gas segregation chamber. The gas segregation chamber comprises a housing that is defined by housing sides that extend from a top housing surface to a rim. The method further comprises resting the rim atop regolith, wherein a first interior environment is defined within the housing when the rim is resting atop the regolith. A first temperature above 5° K is maintained in at least one cooling surface that is disposed in the gas segregation chamber. A majority of higher temperature condensing gases are condensed in the first interior environment but not a lower temperature condensing gas is not condensed in the first interior environment. The lower temperature condensing gas is captured in a carbon adsorber that is located in the adsorption gas capturing chamber, wherein the lower temperature condensing gas migrates from the first interior environment to a second interior environment that is defined within the adsorption gas capturing chamber.

DETAILED DESCRIPTION

Initially, this disclosure is by way of example only, not by limitation. Thus, although the instrumentalities described herein are for the convenience of explanation, shown and described with respect to exemplary embodiments, it will be appreciated that the principles herein may be applied equally in other similar configurations involving the subject matter directed to the field of the invention. The phrases "in one embodiment", "according to one embodiment", and the like, generally mean the particular feature, structure, or characteristic following the phrase, is included in at least one embodiment of the present invention and may be included in more than one embodiment of the present invention. Importantly, such phases do not necessarily refer to the same embodiment. If the specification states a component or feature "may", "can", "could", or "might" be included or have a characteristic, that particular component or feature is not required to be included or have the characteristic. As used herein, the terms "having", "have", "including" and "include" are considered open language and are synonymous with the term "comprising". Furthermore, as used herein, the term "essentially" is meant to stress that a characteristic of something is to be interpreted within acceptable tolerance margins known to those skilled in the art in keeping with typical normal world tolerance, which is analogous with "more or less." For example, essentially flat, essentially straight, essentially on time, etc. all indicate that these characteristics are not capable of being perfect within the sense of their limits. Accordingly, if there is no specific +/−value assigned to "essentially", then assume essentially means to be within +/−2.5% of exact. The term "connected to" as used herein is to be interpreted as a first element physically linked or attached to a second element and not as a "means for attaching" as in a "means plus function". In fact, unless a term expressly uses "means for" followed by the gerund form of a verb, that term shall not be interpreted under 35 U.S.C. § 112 (f). In what follows, similar or identical structures may be identified using identical callouts.

With respect to the drawings, it is noted that the figures are not necessarily drawn to scale and are diagrammatic in nature to illustrate features of interest. Descriptive terminology such as, for example, upper/lower, top/bottom, horizontal/vertical, left/right and the like, may be adopted with respect to the various views or conventions provided in the figures as generally understood by an onlooker for purposes of enhancing the reader's understanding and is in no way intended to be limiting. All embodiments described herein are submitted to be operational irrespective of any overall physical orientation unless specifically described otherwise, such as elements that rely on gravity to operate, for example.

Described herein are embodiments directed to collecting vaporize gaseous atoms and molecules in an extremely low-pressure environment and collecting those vaporize gaseous atoms and molecules using cryogenically cooled surfaces, such as plates. Extremely low-pressure environment is defined herein as below $1 \times 10^{-5}$ bars, wherein pressure at sea-level on Earth is approximately 1 bar. Aspects of the present invention consider mining gaseous atoms and molecules on extraterrestrial bodies such as the Moon, asteroids, moons orbiting other planets, etc., for example. Many of these extraterrestrial bodies have little to no ambient pressure at or just beyond their surfaces and depending on the size of the extraterrestrial body have a significantly lower gravitational pull than that experienced on Earth.

Though embodiments of the present invention can be used in conjunction with many different extraterrestrial bodies, it is one object of the present invention to focus on mining gaseous atoms and molecules (materials) from the Moon. The Moon's atmosphere (the surface boundary exosphere) has a pressure of about $3 \times 10^{-15}$ bars and can range in temperature between 20° to 400° Kelvin. In the interest of continued exploration of the Moon as well as maintaining long-term residents on the Moon, extracting or otherwise mining important gaseous materials from the Moon, such as oxygen, nitrogen, hydrogen, and helium, for example, reduces the dependency of transporting such gaseous materials from the Earth. Moreover, helium-3, a light stable isotope of helium having two protons and one neutron, which has promise as an important constituent in fusion reactions, is far more abundant on the Moon than the Earth. In some estimates, helium-3 is more than a thousand times more abundant on the Moon than compared to the Earth making the Moon a better target to obtain helium-3.

Certain embodiments of the present invention envision extracting target gaseous materials from the Moon by heating up moon regolith (lunar soil/minerals) to gas vaporizing temperatures defined as temperatures that are high enough to liberate/vaporize these target gaseous materials from moon regolith, or simply "regolith". The vaporized target gaseous materials are then collected as liquid from condensation surfaces that are at or below the condensation temperatures corresponding to each of the target gaseous materials. When condensed i.e., liquefied, the liquid or frozen, which improves the transportation of these target materials.

In that light, embodiments of the present invention contemplate a vapor collection system that segregates higher temperature condensing vapor, such as hydrogen, oxygen, and nitrogen, from lower temperature condensing vapor, such as helium, that can be used at an extra-terrestrial body to collect target gaseous atoms and molecules that are floating around in a shielded environment at a pressure at or less than $1 \times 10^{-5}$ bar.

Presented below are embodiments of a segregating gas arrangement that generally comprises a gas segregation chamber, at least one cooling plate in the gas segregation chamber, and a carbon adsorber in an adsorption gas capturing chamber. The gas segregation chamber has a rim that when resting atop regolith defines a first interior environment. The cooling plates are in the gas segregation chamber, wherein the cooling plates are maintained at a first temperature above 5° K, which is a condensation temperature that higher temperature condensing gases will condense. The adsorption gas capturing chamber defines a second interior environment that is in communication with the first interior environment. The carbon adsorber is in the second interior environment and is maintained at a second temperature below 3° K. The carbon adsorber is configured to capture the low temperature condensing gas.

Figure 1A:
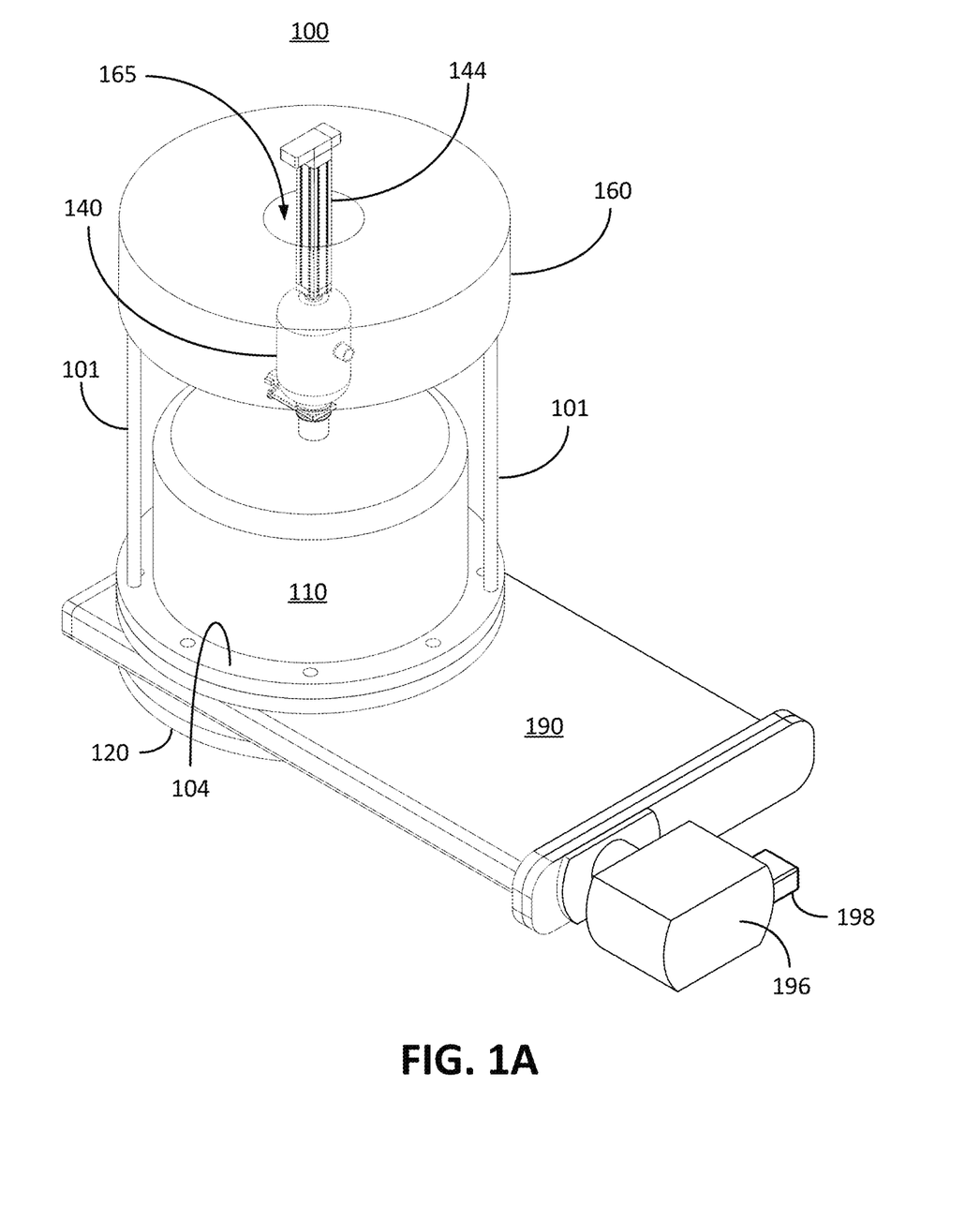
FIGS. 1A and 1B are line drawings of isometric views of the gas capturing arrangement depicting the base open and closed consistent with embodiments of the present invention.
Figure 1B:
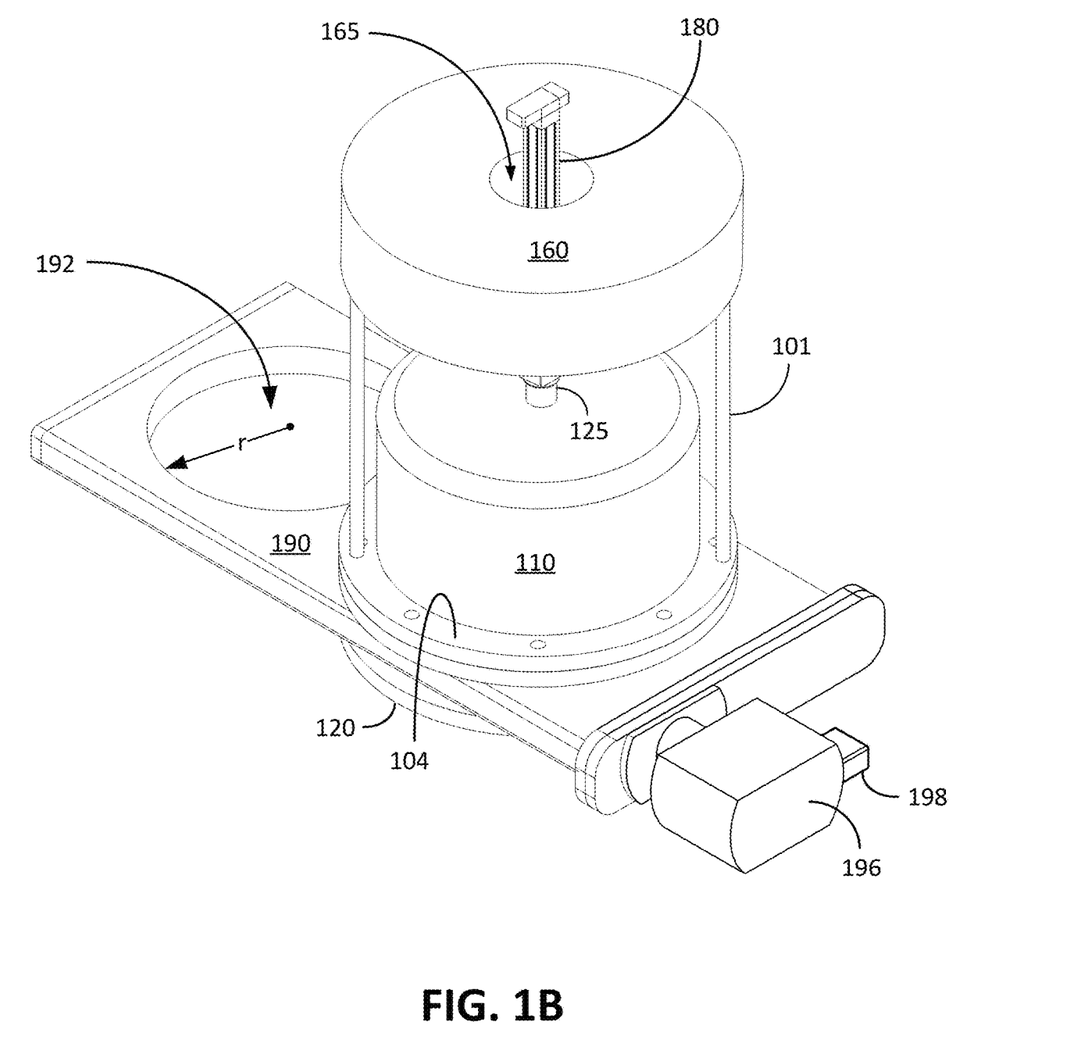

With respect to FIGS. 1A and 1B, the reservoir 160 is shown connected to and supported by the gas capturing arrangement base 104 via support legs 101, however a skilled artisan will immediately appreciate that there are numerous other ways of supporting a reservoir 160 to the gas capturing arrangement 100 without departing from the scope and spirit of the present invention. The carbon adsorber 145 and in some cases the entire adsorption gas capturing chamber 140 can be removed by an adsorber access arm 180 via an access port 165 in the reservoir 160, which would be done after the upper gate valve 124 closes off the connecting passageway 125. A sliding gas segregation chamber gate valve gate 190 (door) is interposed between the gas capturing arrangement base 104 and a rim 120 that is arranged and configured to rest atop a granular surface 200, such as regolith. The sliding gas segregation chamber door 190 comprises an inlet aperture 192 that is aligned with an intake port 121 defined as the space within the inside boundary of the rim 120. The sliding gas segregation chamber door 190 can be actuated by a motor 196 that can be electrically connected to a power source (not shown) via an electrical connector 198. It should be appreciated that though motors, electronics, computers, algorithms may not be shown, such elements can be employed to enhance the functionality of the embodiments described below, however their absence does not change the fundamental functionality of the embodiments to enable the reader to appreciate the scope of the ideas presented herein.

Figure 1C:
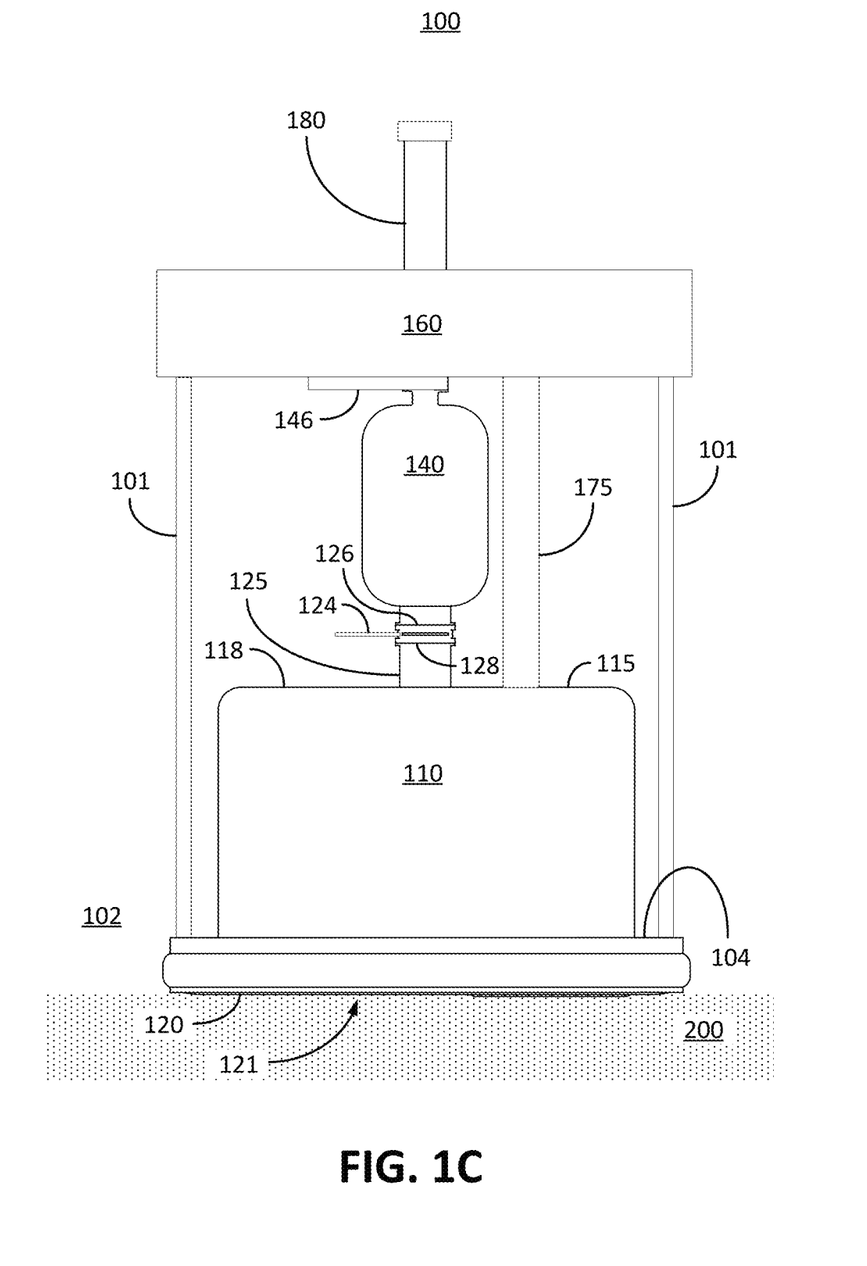
FIG. 1C is a line drawing of a side view of the gas capturing arrangement consistent with embodiments of the present invention.
Figure 1D:
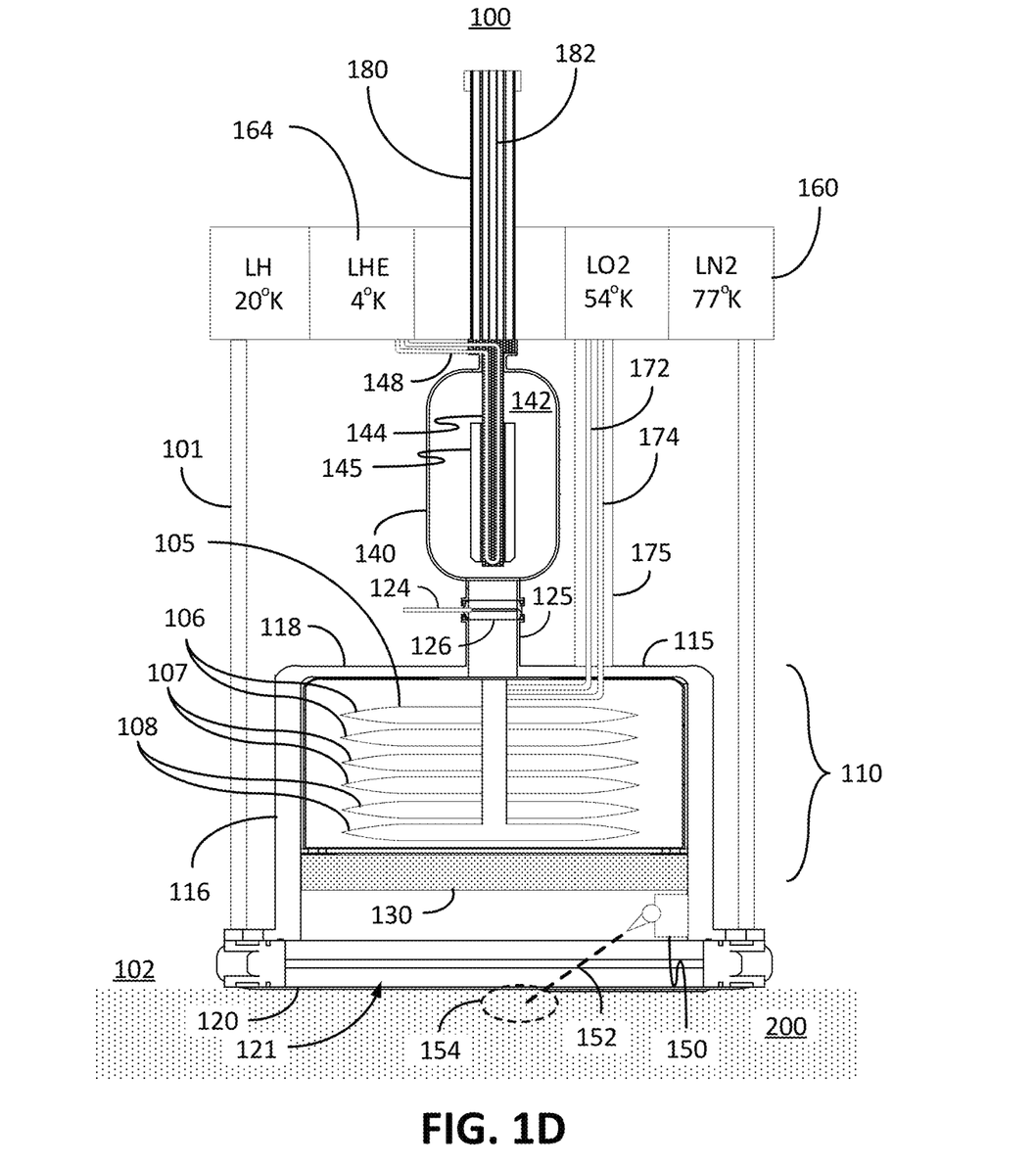
FIG. 1D is a line drawing of a side view cross-section of the gas capturing arrangement from the side view of FIG. 1C consistent with embodiments of the present invention.

As shown in FIG. 1C in view of FIG. 1D, the gas capturing arrangement 100, and more particularly, the rim 120 is resting on or otherwise in contact with regolith 200. The gas segregation chamber gate valve 190 is open providing communication between the internal segregation chamber environment 112 and the regolith 200 via the inlet region 121, as shown in FIG. 1B. The adsorption gas capturing chamber 140 is connected to the top housing surface 118 of the gas segregation chamber 110 via the connecting passageway 125. The gate 124 of the upper gate valve 126 is open thereby providing communication between the internal segregation chamber environment 112 and the adsorption gas capturing chamber environment 142. When the upper gate valve 126 is closed, the adsorption gas capturing chamber 140 can be separated from the gas segregation chamber 110 at the separation junction 128. The adsorption gas capturing chamber 140 can be lifted from the gas segregation chamber 110 through the access port 165 in the reservoir 160 via the adsorber access arm 180. Liquid cryogen is delivered from the reservoir 160 to the gas segregation chamber 110 via lines in the feed and return line conduit 175 and to the upper chamber heat sink 144 via the lines in upper chamber conduit 146. In the present embodiment, the cryogenic liquid coolant reservoir 160 is held in place relative to the base 104 via the support legs 101.

With continued reference to FIG. 1D, as shown by the cross-section, the gas capturing arrangement 100 depicts the generic cooling plates 105 disposed inside of the gas segregation chamber 110. The gas segregation chamber 110 can be configured and arranged like a cryopump with one or more plates 105.

One embodiment contemplates a plurality of plates 105 with an upper first plate or plates 106 being at a first temperature, a middle second plate or plates 107 maintained at a second temperature, and a lower third plate or plates 108 maintained at a third temperature. This embodiment contemplates the option of the first temperature being colder than the second temperature, the second temperature being colder than the third temperature. In other words, the plates 105 get progressively colder as they near the top housing surface 118. The first temperature can be maintained by pumping a first cryogenic fluid through lines in the first plate or plates 106. The second temperature can be maintained by pumping a second cryogenic fluid through lines in the second plate or plates 107. The third temperature can be maintained by pumping a third cryogenic fluid through lines in the third plate or plates 108. Certain embodiments contemplate the first cryogenic fluid being liquid helium, the second cryogenic fluid being liquid hydrogen, and the third cryogenic fluid being liquid nitrogen.

Another embodiment contemplates one or more plates 105 in the gas segregation chamber 110 being infused with a third cryogenic fluid at a third temperature to segregate out a first gas, such as water vapor, that will condense and freeze on the surface of the one or more plates 105. After a first period of time that is sufficient to segregate out the first gas, the one or more plates 105 can be infused with a second cryogenic fluid at a second temperature to segregate out a second gas, such as nitrogen, that will condense on the surface of the one or more plates 105. After a second period of time that is sufficient to segregate out the second gas, the one or more plates 105 can be infused with a first cryogenic fluid at a first temperature to segregate out a third gas, such as oxygen and hydrogen, that will condense on the surface of the one or more plates 105. The first cryogenic fluid is colder than the second cryogenic fluid, which is colder than the third cryogenic fluid. Certain embodiments contemplate the first cryogenic fluid being liquid helium, the second cryogenic fluid being liquid hydrogen, and the third cryogenic fluid being liquid nitrogen.

Yet another embodiment contemplates the one or more plates 105 in the gas segregation chamber 110 being infused with a single cryogenic fluid, such as liquid helium, that is configured to segregate all gasses out of the gas segregation chamber 110 except helium. In this embodiment, the one or more plates 105 can be maintained at a temperature slightly above the condensation temperature of helium, such as via heat boosts or design of the cryogenic fluid carrying passageways 122 in the cooling plates 105.

The gas segregation chamber 110 is defined within a segregation chamber housing 115. The segregation chamber housing 115 is defined by housing sides 116 that extend from a top housing surface 118 to a rim 120. The segregation chamber housing 115 defines an internal environment 112, which is in communication with an external environment 102 via an inlet region 121 at the rim 120 when the lower gate valve 190 is open. The inlet region 121 is an opening that spans that the rim 120. For example, if the rim 120 is circular with a radius r, the inlet region 121 is the area of the circle ($\pi r^2$). This assumes the inlet aperture 192 in the lower gate valve 190 is open or otherwise not obstructing the inlet region 121. The external environment 102 is defined outside of the housing 115.

The rim 120 is configured and arranged to rest atop a granular surface 200, such as regolith. There can be a filter 130 that is configured to trap regolith dust from entering the internal environment 210 via the inlet region 121. The filter 130 can be a HEPA filter or ULPA filter, for example. Certain embodiments envision to filter but rather the use of magnets with or without ionizers to electromagnetically prevent the regolith dust from entering the internal segregation chamber environment 112.

The gas capturing arrangement 100 can further comprise a heating element 150 configured to emit energy 152 that heats a target volume 154 of regolith 200 at and beyond the rim 120. The heating element 150 can be a laser that emits a laser beam, an ultrasound generator that emits ultrasound, a microwave generator that emits microwaves, a radiant heater that emits radiant heat, etc. When the regolith 200 is heated, gaseous elements are liberated and captured within the gas segregation chamber 110. Some embodiments envision the heating element not being in the gas segregation chamber 110 but rather outside of the gas segregation chamber 110, wherein the externally located heating element directs heat in the regolith 200 under the gas segregation chamber 110.

The adsorption gas capturing chamber 140 is attached to the gas segregation chamber 110 via a connecting passageway 125, which provides communication between the two chambers 110 and 140. In this embodiment, communication can be broken between the internal segregation chamber environment 112 the adsorption gas capturing chamber environment 142 via the gate valve 126 when the gate 124 is closed. Certain embodiments contemplate the adsorption gas capturing chamber 140 being detachable from the gas segregation chamber 110, such as for example at the gate valve 126. Other embodiments contemplate the adsorption gas capturing chamber 140 being directly attached to the gas segregation chamber 110 (that is with no connecting passageway 125 therebetween).

With respect to the adsorption gas capturing chamber 140, disposed therein is a carbon adsorber 145 configured and arranged to capture isolated gas that is not targeted to be captured in the gas segregation chamber 110. The carbon adsorber 145 is comprised of a highly porous carbon that is well known for having a high surface area due to its high porosity. Certain embodiments envision capturing the isolated gas that migrates into the adsorption gas capturing chamber 140 in the pores of the carbon adsorber 145. In the present embodiment, the carbon adsorber 145 is in contact with a heat sink 142, which is maintained at or near the cryogenic temperature of the cryogenic fluid circulating therethrough via the upper chamber cryogen feed and return lines 148. The heat sink 142 is a body at essentially the lowest temperature in the gas capturing arrangement 100. The upper chamber heat sink 144 cools the carbon adsorber 145 by way of conduction to near the temperature of the heat sink 142, within a degree or two Kelvin.

The adsorption gas capturing chamber 140 is connected to an adsorber access arm 180 that can assist in removing the adsorption gas capturing chamber 140 from the gas capturing arrangement 100. Certain embodiments envision a duct 182 inside of the adsorber access arm 180 configured to pull gas collected in the carbon adsorber 145 for storage and transport via a secondary gas receiving system (not shown).

Figure 2A:
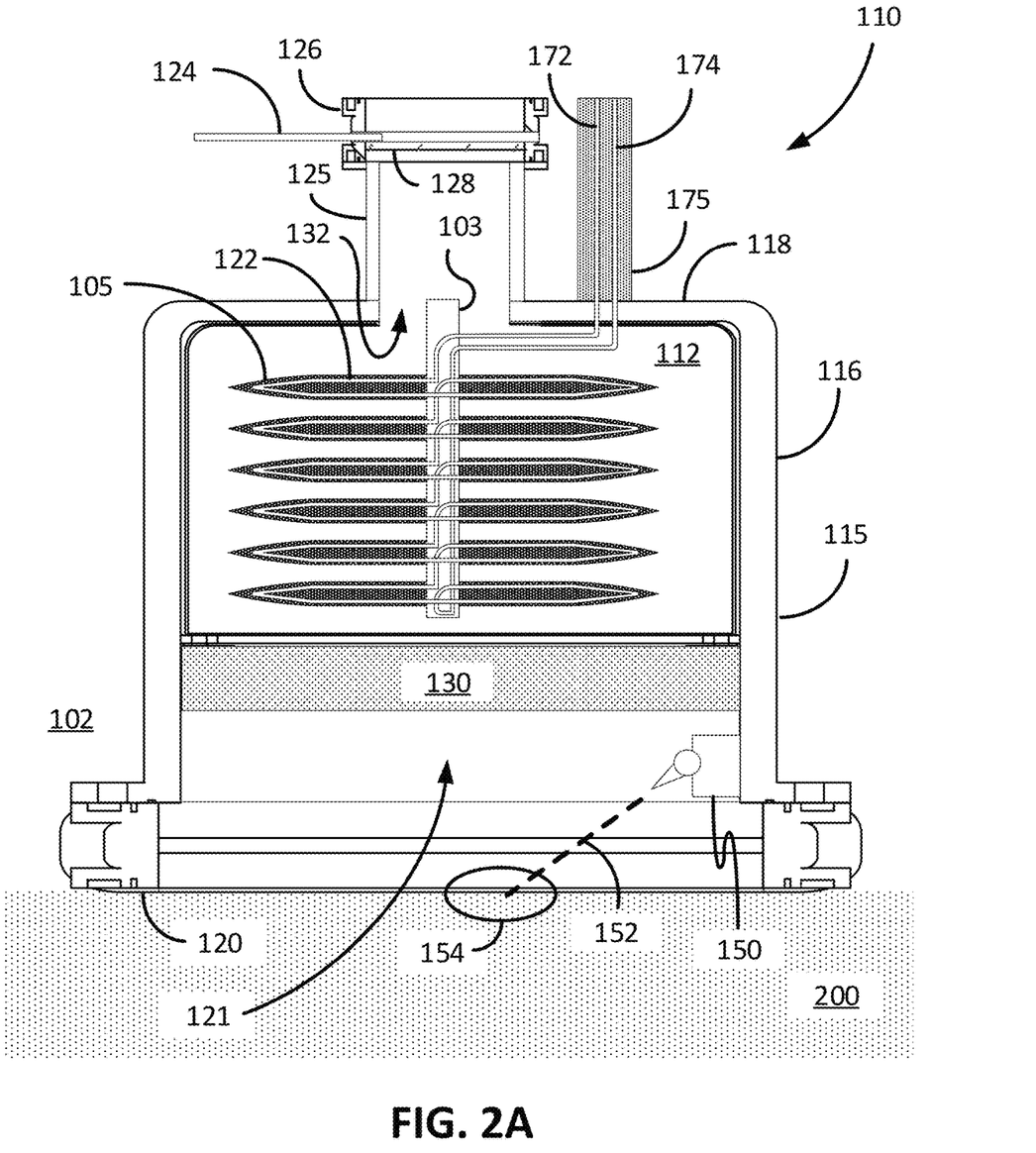
FIG. 2A is a line drawing of a cross-section view of the gas segregation chamber consistent with embodiments of the present invention.

FIG. 2A is a line drawing of a cross-section view of the gas segregation chamber 110 consistent with embodiments of the present invention. FIG. 2A is in view of FIG. 1C identifying associated elements called out. In this embodiment, there are six cooling plates 105 attached to one another via a stem 103 extending through the center of the cooling plates 105. The stem 103 can attach to the segregation chamber housing 115 via a web or spokes, not shown, which permit unobstructed movement of gas from the gas segregation chamber 110 into the adsorption gas capturing chamber 140 via the connecting passageway 125. Each of the cooling plates 105 comprise cryogenic fluid carrying passageways 122 through which cryogenic fluid is circulated from the feed line 172. The cryogenic fluid carrying passageways 122 ultimately loop back to the cryogenic fluid coolant reservoirs 160 via the return line 174. The feed line 172 and return line 174 are shielded by a feed and return line conduit 175. The cryogenic fluid is circulated through the cryogenic fluid carrying passageways 122 in the cooling plates 105 to bring the temperature of the cooling plates to below the condensation temperature of one or more target gasses in the internal segregation chamber environment 112. In the present embodiment, the cooling plates 105 are disk shaped but other embodiments contemplate other shapes, such as blades, rectangles, etc., without departing from the scope and spirit of the present invention. The gas segregation chamber 110 is considered a cryogenic 'roughing pump' to segregate out a majority of higher temperature condensing gasses from the lower temperature condensing gases before the lower temperature gasses migrate into the adsorption gas capturing chamber 140.

In practice, the heating element 150 heats the regolith 200 to a temperature above which will liberate gasses trapped in the regolith 200. The liberated gasses (of which there may be several different types, such as hydrogen, oxygen, helium, nitrogen, argon, etc.) enter the internal segregation chamber environment 112 via the inlet region 121 (when open) defined as either the area within the rim 120 or the area of the inlet aperture 192, whichever is smaller. In some embodiments, the inlet area within the rim 120 is the same as the area of the inlet aperture 192. The heating element 150 can diffuse energy to the surface of the regolith 200. The energy can be radiant energy, microwave energy, ultrasonic energy, conductive energy from a contact heater, or a laser that sweeps over an area under the area within the rim 120, just to name several non-limiting examples. In this embodiment a filter 130 interposed between the rim 120 and the cooling plates 105 prevents or at the least greatly reduces any dust from entering the internal segregation chamber environment 112 without blocking any gases.

With continued reference to the cooling plates 105, certain embodiments envision the cooling plates 105 being maintained at a temperature that is cold enough to condense out all gasses except for helium. In this case, liquid helium is circulated through the cooling plates 105 to maintain a temperature of the cooling plates 105 slightly above the condensation temperature of helium. In this way, helium is segregated from the other gases and will migrate through the connecting passageway 125 and into the adsorption gas capturing chamber 140, assuming the upper gate valve 126 is open. Meanwhile, the cooling plates 105 will, condensed water, oxygen, nitrogen, hydrogen, etc. hence the roughing pump portion of the gas collection arrangement 100. The valve 126 can be closed and the adsorption gas capturing chamber 140 can be separated at separation junction 128 for processing the contents of each chamber 110 and 140 remotely or on-site.

Certain other embodiments envision multiple different kinds of cryogenic fluid at different temperatures either made to flow through the cooling plates 105 successively to provide a successively colder internal segregation chamber environment 112 as discussed above. For example, liquid nitrogen can be made to flow through the cooling plates 105 first, followed by liquid oxygen, then liquid hydrogen and lastly followed by liquid helium. Another embodiment envisions the bottom two cooling plates 105 being maintained at a temperature that condenses water, the middle two cooling plates 105 being held at a temperature to condense oxygen and the upper two cooling plates 105 being held at a temperature that condenses hydrogen. This can be accomplished with multiple fluid cryogens or a single cryogen with different geometries of the cryogenic fluid carrying passageways 122 in each set of cooling plates 105 or optionally electric heaters embedded in the cooling plates 105 for temperature control, just to name several examples. The condensate on the cooling plates 105 can be collected and processed for later use. The heaters in the cooling plates 105 can further be used to heat the cooling plates 105 to a temperature the liberates the condensed gas from the plate surfaces for further processing.

Figure 2B:
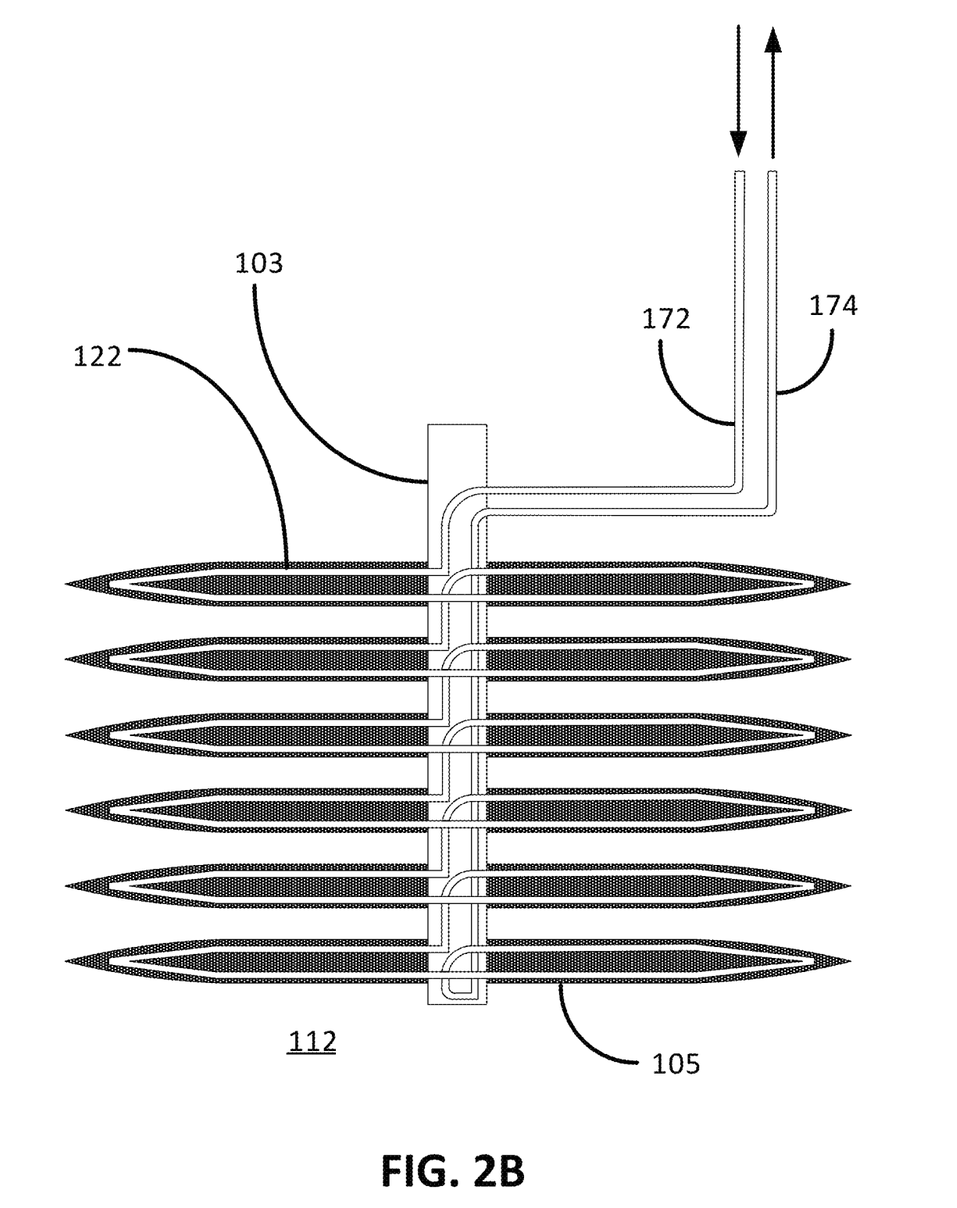
FIG. 2B is a line drawing of a higher resolution cross-section line drawing of the cooling plates consistent with embodiments of the present invention.

FIG. 2B is a higher resolution cross-section line drawing of the cooling plates 105 consistent with embodiments of the present invention. As shown, there is a downward arrow indicating the direction of cryogenic fluid flow in the feed line 172. The feed line 172 connects into each cooling plate 105 via the cryogenic fluid carrying passageways 122. In the present embodiment, the cryogenic fluid carrying passageways 122 in each cooling plate 105 connect to one another through the stem 103. The cryogenic fluid carrying passageway 122 in the bottom cooling plate 105 connects to the return line 174 in the stem 103 where it can flow (be pumped) back into the reservoir tank 160, shown by the up facing arrow.

Figure 3:
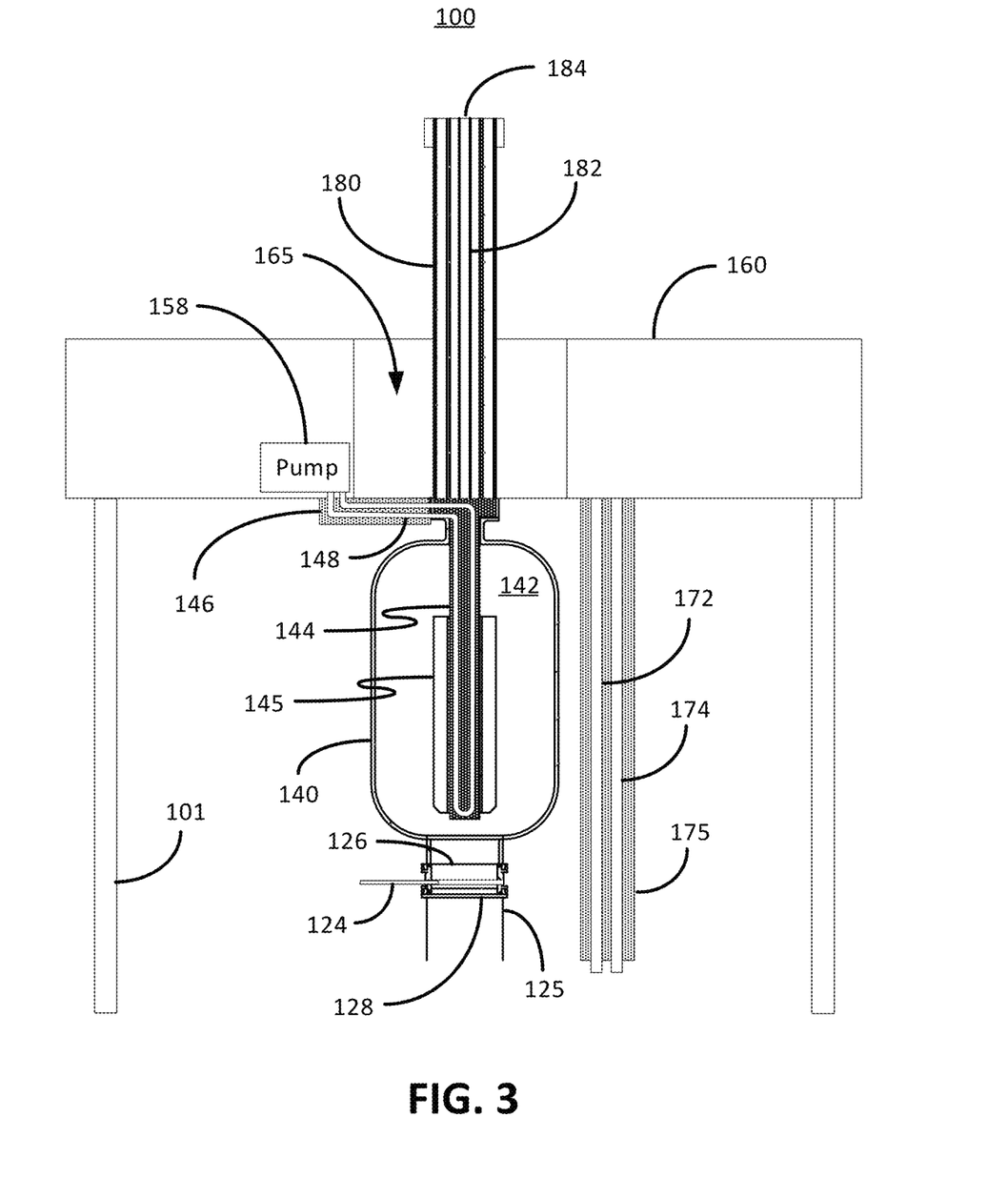
FIG. 3 is a higher resolution cross-section line drawing of the adsorption gas capturing chamber and cryogenic liquid coolant reservoir consistent with embodiments of the present invention.

FIG. 3 is a higher resolution cross-section line drawing of the adsorption gas capturing chamber 140 and cryogenic liquid coolant reservoir 160 consistent with embodiments of the present invention. As shown, a pump 158 disposed in the reservoir 160 is configured to circulate cryogenic liquid coolant through the upper chamber cryogen feed and return lines 148 and in one embodiment the lower chamber cryogen feed line 172 and return line 174. Other embodiments envision a separate pump circulating cryogenic liquid coolant through the lower chamber cryogen feed line 172 and return line 174. The adsorption gas capturing chamber 140 comprises a carbon adsorber 145 that is in contact with the upper chamber heat sink 144. The carbon adsorber 145 is cooled through conduction while the heat sink 144 is being cooled by the cryogen circulating through the upper chamber cryogen feed and return lines 148. In operation, the adsorption gas capturing chamber 140 is envisioned to mostly contain helium gas (as the segregated, targeted gas) since the other gasses liberated from the regolith 200 are mostly condensed in the gas segregation chamber 110. The helium gas contains a concentration of both He-3 and He-4 of which become trapped in the carbon adsorber 145. Because He-3 condenses at around 3° K, the carbon adsorber 145 is kept below that temperature to help retain He-3 and He-4.

The contents of the carbon adsorber 145, such as He-3 and He-4 from the example above, can be harvested by closing the gate valve 126, separating the adsorption gas capturing chamber 140 from the connecting passageway 125 at the separation junction 128, and removing the adsorption gas capturing chamber 140 through the access port 185 in the reservoir 160. Once removed, the adsorption gas capturing chamber 140 can be replaced with a new or ready to use adsorption gas capturing chamber 140. The adsorption gas capturing chamber 140 that has been collecting gas can be processed in a processing facility equipped to harvest or otherwise extract the gas captured in the adsorption gas capturing chamber 140 and the carbon adsorber 145. Optionally, the gas captured in the adsorption gas capturing chamber 140 and the carbon adsorber 145 can be extracted without removing the adsorption gas capturing chamber 140 via the access arm duct 182 extending through the adsorber access arm 180 by connecting an extractor at the access port 184 at the top of the adsorber access arm 180. In yet another harvesting option, the carbon adsorber 145 is envisioned to be a cartridge that is removable from the adsorption gas capturing chamber 140 and replaceable with a new or ready to use cartridge.

Figure 4:
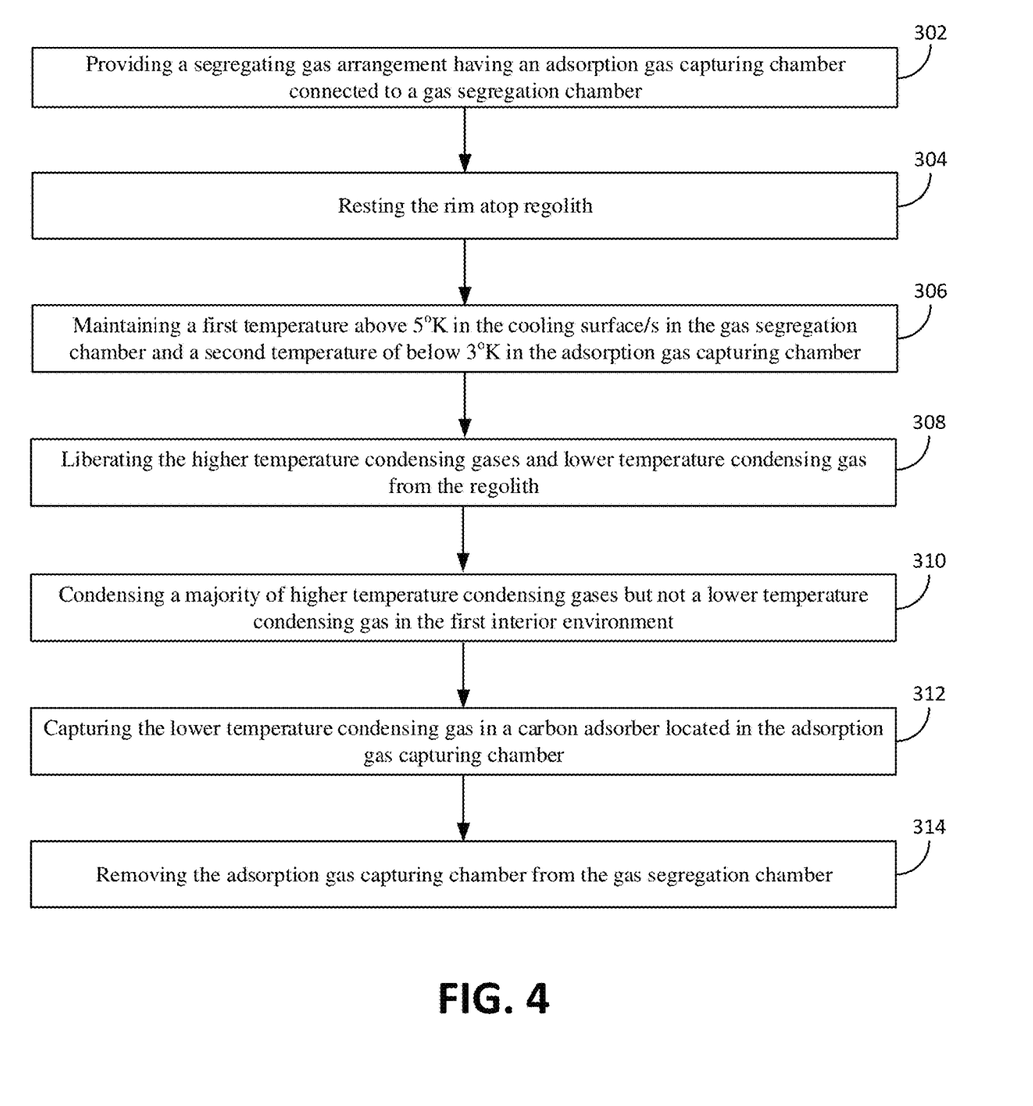
FIG. 4 is a block diagram describing method steps of using the segregating gas arrangement consistent with embodiments of the present invention.

FIG. 4 is a block diagram describing method steps of using the segregating gas arrangement 100 consistent with embodiments of the present invention. FIG. 4 is intended to be seen in view of the preceding figures with the callout numbers corresponding to the elements referred to therein. Step 302 refers to the segregating gas arrangement 100 as described above. Though the adsorption gas capturing chamber 140 is shown connected to the top portion of the gas segregation chamber 110, the adsorption gas capturing chamber 140 can be connected elsewhere. Certain other embodiments envision a single gas segregation chamber 110 (no separate adsorption gas capturing chamber 140) with the carbon adsorber 145 therein using potentially separate temperatures at different times to capture higher condensing temperature gasses then lower condensing temperature gas/es as described herein.

Step 204 is a step for locating the segregating gas arrangement 100 to a spot/location on the Moon or some other extraterrestrial body and resting the rim 120 of the gas segregation chamber 110 atop regolith 200. The positioning could be accomplished with a rover, manually, by a hovering device, or simply by deploying the segregating gas arrangement 100 from an orbiting or hovering craft.

Once deployed with the rim 120 resting on the regolith 200, as shown in step 306, the cooling plates 105 in the gas segregation chamber 110 are brought down to a temperature at or above 5° K, which can be accomplished by circulating liquid helium through channels 122 in the cooling plates 105. The cooling plates 105 are one embodiment of a cooling surface, which could be one or more screens, blades, channels, or some other surface that can be chilled as understood by those skilled in the art. 5° K is the temperature that all higher condensing temperature gasses other than helium will condense, which will essentially segregate or otherwise rough the higher temperature condensing gasses out in the gas segregation chamber 110. This process isolates helium gas (He-3 and He-4) to migrate into the adsorption gas capturing chamber 140 where it can be adsorbed by a carbon adsorber 145 maintained at below 3° K, which is a temperature that helium condenses. In order to accomplish these low temperatures, the liquid helium supplied by the reservoir 160 can be pressurized and further cooled. This process can be adjusted to different temperatures to target specific gasses having a higher condensing temperature than helium, such as targeting hydrogen or something else while roughing out even higher condensing temperature gasses.

As presented in step 308, the gas to be captured within the segregating gas arrangement 100 is liberated from the regolith 200 under the rim 120 via a heater 150 that heats up the regolith 200 to temperatures that may exceed 800° K. The liberated gas enters the interior environment 112 of the gas segregation chamber 110 through an opening (inlet region) 121 in the rim 120. In certain embodiments, the inlet region/opening 121 can be shut via a gate valve 190 to isolate at least the first interior environment 112. When the gate valve 190 is closed, the gases trapped in the gas segregation chamber 110 can be contained for further processing without simply escaping back through the inlet region/opening 121 and into the exterior environment 102.

With the different gasses in the segregating gas arrangement 100, a majority of the higher temperature condensing gases condense on the cooling plates 105 (step 310) preserving the lower condensing gases, such as helium, to condense in the carbon adsorber 145 (step 312). The carbon adsorber 145 and helium can be isolated from the gas segregation chamber 110 by closing the upper gate valve 126. In this way the carbon adsorber 145 can be removed from the adsorption gas capturing chamber 140 for further processing. Optionally, the adsorption gas capturing chamber 140 can be separated from and entirely removed from the segregating gas arrangement 100 at a junction between the gas segregation chamber 110 and the adsorption gas capturing chamber 140 (step 314). Certain other embodiments envision a mobile gas collector (not shown) going to the segregating gas arrangement 100 and pulling the accumulated helium gas from the adsorption gas capturing chamber 140 via an access arm duct 182 in the adsorber access arm 180 that extends from the adsorption gas capturing chamber 140. In another embodiment, the adsorption gas capturing chamber 140 can be heated to liberate the trapped helium gas in the carbon adsorber 145 when pulling the helium gas via the adsorber access arm 180. A similar technique can be used with the gas segregation chamber 110 to collect the higher condensing temperature gases trapped therein.

With the present description in mind, below are some examples of certain embodiments illustratively complementing some of the apparatus embodiments discussed above and presented in the figures to aid the reader. Accordingly, the elements called out below are provided by example to aid in the understanding of the present invention and should not be considered limiting. The reader will appreciate that the below elements and configurations can be interchangeable within the scope and spirit of the present invention. The illustrative embodiments can include elements from the figures.

In that light, certain embodiments of the present invention envision a gas collection system 100 generally comprising a gas segregation chamber 110, at least one cooling plate 105 in the gas segregation chamber 110, an adsorption gas capturing chamber 140 connected to the gas segregation chamber 110 and a carbon adsorber 145 in the adsorption gas capturing chamber 140. The gas segregation chamber 110 comprises a housing 115, wherein the housing 115 is defined by housing sides 116 that extend from a top housing surface 118 to a rim 120. A first interior environment 112 is defined within the housing 115, wherein the first interior environment 142 is in communication with an external environment 102 through only the rim 120. The external environment 102 defined outside of the housing 115. At least one cooling plate 105 is in the gas segregation chamber 110, wherein the least one cooling plate 105 comprises a passageway 122 that is configured to accommodate cryogenic fluid. An adsorption gas capturing chamber 140 is connected to the housing 115, wherein the adsorption gas capturing chamber 140 comprises a second interior environment 142 that is in communication with the first interior environment 112 via a connecting port 132. A carbon adsorber 145 is in the second interior environment 142.

The gas collection system 100 further envisions the carbon adsorber 145 being a cartridge that is removable from the gas collection system 100.

The gas collection system 100 further contemplates that the connecting port 132 leads into a connecting passageway 125 that comprises a valve 126 configured to separate the first interior environment 112 from the second interior environment 142 when closed. One embodiment contemplates the valve 126 being a gate valve. Another embodiment contemplates the carbon adsorber 145 being in communication with the gas segregation chamber 110 only when the valve 126 is open.

Another embodiment of the gas collection system 100 contemplates the adsorption gas capturing chamber 140 being removable from the housing 115.

The gas collection system 100 can further comprise a heating element 150 that is configured to heat granular soil 200 under the rim 120 when the rim 120 rests atop the granular soil 200. One embodiment contemplates the heating element 150 being selected from a group consisting of a laser, a radiant heater, an ultrasonic heater, or a microwave heater.

The gas collection system can further comprise a filter 130 being disposed between the at least one cooling plate 105 and the rim 120, the filter 130 is configured to filter non-gaseous material from entering the first interior environment 112 from the external environment 102.

The gas collection system 100 can further comprise a lower valve 190 that when closed seals the at least one cooling plate 105 from the external environment 102.

The gas collection system 100 further imagines the carbon adsorber being an activated carbon adsorber.

The gas collection system can further comprise a heat sink 144 being in contact with the carbon adsorber 145, wherein the heat sink 144 comprises cryogen feed and return lines 148 that are configured to cool the carbon adsorber 145.

The gas collection system 100 can further comprise a pump 158 and a reservoir 160 that is configured to hold cryogenic liquid.

In another aspect of the present invention, some embodiments envision a gas collection arrangement 100 that generally comprises a gas segregation chamber 110, at least one cooling plate 105 in the gas segregation chamber 110, an adsorption gas capturing chamber 140 and a carbon adsorber 145. The gas segregation chamber 110 defines a first interior environment 112 when a rim 120 of the gas segregation chamber 110 rests atop regolith 200. The gas segregation chamber 110 also comprises at least one cooling plate 105 that is configured to capture higher temperature condensing gas but not low temperature condensing gas, wherein the gases are released from the regolith 200. The adsorption gas capturing chamber 140 defines a second interior environment 142 that is in communication with the first interior environment 112 via a connecting port 132. The carbon adsorber 145 is in the second interior environment 142, wherein the carbon adsorber is configured to capture the low temperature condensing gas.

The gas collection arrangement 100 can further comprise a tank 160 that is configured to contain cryogenic liquid to cool the at least one cooling plate 105 to first temperature and the carbon adsorber 145 to a second temperature that is lower than the first temperature.

The gas collection arrangement 100 further envisioning the low temperature condensing gas being helium and the high temperature gas including hydrogen and oxygen.

The gas collection arrangement 100 can further comprise a heat sink 144 that is connected to the carbon adsorber 145, the heat sink 144 configured to cool the carbon adsorber at or below a temperature at which the low temperature condensing gas condenses.

The gas collection arrangement 100 can further comprise a valve 126 that is between the gas segregation chamber 110 and the adsorption gas capturing chamber 140, the valve 126 is configured to cut off the communication between the first interior environment 112 and the second interior environment 142.

Another embodiment of the present invention contemplates a segregating gas arrangement 100 generally comprising a gas segregation chamber 110, at least one cooling plate 105 in the gas segregation chamber 110, at least one cooling plate 105 in the gas segregation chamber 110, and a carbon adsorber 145. The gas segregation chamber 110 comprises a rim 120 that when resting atop regolith 200 defines a first interior environment 112. The at least one cooling plate 105 is in the gas segregation chamber 110, wherein the least one cooling plate 105 is maintained at a first temperature above 5° K, which is a condensation temperature at which higher temperature condensing gases condense. The adsorption gas capturing chamber 140 defines a second interior environment 142 that is in communication with the first interior environment 112. The carbon adsorber 145 is in the second interior environment 142 and is maintained at a second temperature below 3° K. The carbon adsorber is configured to capture the low temperature condensing gas.

The segregating gas arrangement 100 further contemplates the gas segregation chamber 110 being configured to filter out a majority of the higher temperature condensing gases from entering the adsorption gas capturing chamber 140.

Certain other embodiments of the present invention envision a gas segregating method comprising providing a segregating gas arrangement 100 comprising an adsorption gas capturing chamber 140 that is connected to a gas segregation chamber 110. The gas segregation chamber 110 comprises a housing 115 that is defined by housing sides 116 that extend from a top housing surface 118 to a rim 120. The method further comprises resting the rim 120 atop regolith 200, wherein a first interior environment 112 is defined within the housing when the rim 120 is resting atop the regolith 200. A first temperature above 5° K is maintained in at least one cooling surface 105 that is disposed in the gas segregation chamber 110 and a second temperature below 3° K is maintained at the carbon adsorber 145 in the second interior environment 142. A majority of higher temperature condensing gases are condensed in the first interior environment 112 but not a lower temperature condensing gas is not condensed in the first interior environment 112. The lower temperature condensing gas is captured in a carbon adsorber 145 that is located in the adsorption gas capturing chamber 140, wherein the lower temperature condensing gas migrates from the first interior environment 112 to a second interior environment 142 that is defined within the adsorption gas capturing chamber 140.

The gas segregating method can further comprise a step for removing the adsorption gas capturing chamber 140 from the gas segregation chamber 110.

The gas segregating method can further comprise a step for circulating cryogenic fluid through the at least one cooling surface 105 and through a heat sink 144 that is in contact with the carbon adsorber 145, the cryogenic fluid is held in a reservoir 160 of the segregating gas arrangement 100.

The gas segregating method can further comprise a step for removing the carbon adsorber 145 from the segregating gas arrangement 100.

The gas segregating method can further comprise a step for liberating the higher temperature condensing gases and lower temperature condensing gas from the regolith 200 by heating the regolith with a heater 150 that is cooperating with the segregating gas arrangement 100.

The gas segregating method further envisions the at least one cooling surface 105 being a cooling plate.

It is to be understood that even though numerous characteristics and advantages of various embodiments of the present invention have been set forth in the foregoing description, together with the details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended embodiments are expressed. For example, the orientation of the elements and the plate can include other geometries not explicitly shown in the embodiments above while maintaining essentially the same functionality without departing from the scope and spirit of the present invention. Likewise, the materials and construction of the cooling surfaces 105 and heat sink 145 can be different but serve the same purpose without departing from the scope and spirit of the present invention. It should further be appreciated that the valves do not need to be gate valves but could be other valve construction including more than one valve, the basic construction is well known in the art and modification to present embodiments discussed can be made once a skilled artisan is in possession of the concepts disclosed herein. Moreover, the electronics and computing that enable the functionality of the gas collection system 100 are not described in detail because the electronics and computing elements either exist or are easily constructed by those skilled in the art.

It will be clear that the present invention is well adapted to attain the ends and advantages mentioned as well as those inherent therein. While presently preferred embodiments have been described for purposes of this disclosure, numerous changes may be made which readily suggest themselves to those skilled in the art and which are encompassed in the spirit of the invention disclosed and as defined in the appended claims.

What is claimed is:

1. A gas collection system comprising:
a gas segregation chamber comprising a housing, the housing defined by housing sides that extend from a top housing surface to a rim, a first interior environment defined within the housing, the first interior environment in communication with an external environment through only the rim, the external environment defined outside of the housing;
at least one cooling plate in the gas segregation chamber, the least one cooling plate comprising a passageway configured to accommodate cryogenic fluid;
an adsorption gas capturing chamber connected to the housing, wherein the adsorption gas capturing chamber comprises a second interior environment that is in communication with the first interior environment via a connecting port; and
a carbon adsorber in the second interior environment.

2. The gas collection system of claim 1, wherein the carbon adsorber is a cartridge that is removable from the gas collection system.

3. The gas collection system of claim 1, wherein the connecting port leads into a connecting passageway that comprises a valve configured to separate the first interior environment from the second interior environment when closed.

4. The gas collection system of claim 3, wherein the valve is a gate valve.

5. The gas collection system of claim 3, wherein carbon adsorber is in communication with the gas segregation chamber only when the valve is open.

6. The gas collection system of claim 1, wherein the adsorption gas capturing chamber is removable from the housing.

7. The gas collection system of claim 1, further comprising a heating element configured to heat granular soil under the rim when the rim rests atop the granular soil.

8. The gas collection system of claim 7, wherein the heating element is selected from a group consisting of a laser, a radiant heater, an ultrasonic heater, and a microwave heater.

9. The gas collection system of claim 1 further comprising a filter disposed between the at least one cooling plate and the rim, the filter configured to filter non-gaseous material from entering the first interior environment from the external environment.

10. The gas collection system of claim 1 further comprising a lower valve that when closed seals the at least one cooling plate from the external environment.

11. The gas collection system of claim 1, wherein the carbon adsorber is an activated carbon adsorber.

12. The gas collection system of claim 1 further comprising a heat sink in contact with the carbon adsorber wherein the heat sink comprises cryogen feed and return lines configured to cool the carbon adsorber.

13. The gas collection system of claim 1 further comprising a pump and a reservoir configured to hold cryogenic liquid.

14. A gas collection arrangement comprising:
a gas segregation chamber comprising a rim configured to rest atop regolith, wherein when the rim is on the regolith the gas segregation chamber defines a first interior environment;
at least one cooling plate in the gas segregation chamber, the least one cooling plate configured to capture higher temperature condensing gas but not low temperature condensing gas, the gases released from the regolith;
an adsorption gas capturing chamber defining a second interior environment that is in communication with the first interior environment via a connecting port; and
a carbon adsorber in the second interior environment, the carbon adsorber configured to capture the low temperature condensing gas.

15. The gas collection arrangement of claim 14 further comprising a tank configured to contain cryogenic liquid that cools the at least one cooling plate to first temperature and the carbon adsorber to a second temperature that is lower than the first temperature.

16. The gas collection arrangement of claim 14, wherein the low temperature condensing gas is helium and the high temperature gas includes hydrogen and oxygen.

17. The gas collection arrangement of claim 14 further comprising a heat sink connected to the carbon adsorber, the heat sink configured to cool the carbon adsorber at or below a temperature at which the low temperature condensing gas condenses.

18. The gas collection arrangement of claim 14 further comprising a valve between the gas segregation chamber and the adsorption gas capturing chamber, the valve configured to cut off the communication between the first interior environment and the second interior environment.

19. A segregating gas arrangement comprising:
a gas segregation chamber comprising a rim that when resting atop regolith defines a first interior environment;
at least one cooling plate in the gas segregation chamber, the least one cooling plate maintained at a first temperature above 5° K, which is a condensation temperature at which higher temperature condensing gases condense;
an adsorption gas capturing chamber defining a second interior environment that is in communication with the first interior environment;
a carbon adsorber in the second interior environment maintained at a second temperature below 3° K, the carbon adsorber configured to capture the low temperature condensing gas.

20. The segregating gas arrangement of claim 19, wherein the gas segregation chamber is configured to filter out a majority of the higher temperature condensing gases from entering the adsorption gas capturing chamber.

* * * * *